United States Patent
Lindner et al.

(10) Patent No.: US 6,469,616 B1
(45) Date of Patent: Oct. 22, 2002

(54) METHOD FOR INITIALIZING AN ANTI-THEFT SYSTEM OF A MOTOR VEHICLE

(75) Inventors: Frank Lindner, Tegernheim; Frank Rehfeld; Christian Schneider, both of Regensburg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/146,459

(22) Filed: Aug. 31, 1998

(30) Foreign Application Priority Data

Aug. 29, 1997 (DE) .......................... 197 37 874

(51) Int. Cl.⁷ ............................... H04B 1/00
(52) U.S. Cl. ................. 340/5.26; 340/5.61; 340/10.41; 340/825.72; 307/10.5
(58) Field of Search ............ 340/825.31, 825.69, 340/825.72, 5.1, 5.2, 5.61, 5.26, 5.62, 5.72, 428, 426, 10.5, 10.34; 361/171, 172, 175; 307/10.4, 10.5; 70/256, 279.1

(56) References Cited

U.S. PATENT DOCUMENTS 5,559,493 A * 9/1996 Karnwie-Tuah ............ 340/426
5,774,060 A * 6/1998 Ostermann et al. ........ 340/5.61
5,841,363 A * 11/1998 Jakob et al. ............ 340/825.31

FOREIGN PATENT DOCUMENTS

| DE | 4325221 A1 | 2/1995 |
| DE | 4411450 C1 | 3/1995 |
| DE | 19516992 C1 | 4/1996 |
| DE | 4302550 C2 | 2/1997 |

* cited by examiner

Primary Examiner—Michael Horabik
Assistant Examiner—William L. Bangachon
(74) Attorney, Agent, or Firm—Laurence A. Greenberg; Werner H. Stemer; Ralph E. Locher

(57) ABSTRACT

The anti-theft system is placed in the initialization state by activating a key in the ignition lock in a predescribed manner that is unusual relative to the day to day operation. A bidirectional dialog then takes place with the key via an immobilizer system. If the dialog is recognized as authorized, a start value is transmitted, on the one hand from the immobilizer to the key and on the other hand from the key to the receiver of the lock system. The start value is used in the key to generate a rolling code, and is used in the receiver to generate a reference code to be compared with it.

9 Claims, 2 Drawing Sheets

METHOD FOR INITIALIZING AN ANTI-THEFT SYSTEM OF A MOTOR VEHICLE

BACKGROUND OF THE INVENTION

FIELD OF THE INVENTION

The invention relates to a method for initializing an anti-theft system for a motor vehicle and, in particular, for initializing a remote-controlled central locking system.

A prior art anti-theft system described in German patent DE 43 02 550 C2 has a portable transmitter which transmits code signals to a receiver in the motor vehicle in order to remotely control the central locking system. With that system, the code signals are changed with respect to the previous transmission each time a transmission is made (rolling code).

When that anti-theft system is initialized, the transmitters and receivers are initially placed in an initialization state by inputting a special signal via a diagnostic interface or by activating the ignition lock in an unusual way. Then, the receiver must receive a code signal of a previously authorized transmitter before it is possible for the initialization to be carried out.

Such an anti-theft system can be initialized after a battery change only if the last valid code signal is still stored in the transmitter. A complex memory is necessary for that purpose, which inevitably requires more energy. If a simple memory, such as the already available RAM, is used, then the last valid code signal is no longer retained after a battery change. As a result, it is not possible to transmit a valid code signal after a battery change, and the anti-theft system cannot be initialized.

In such an anti-theft system there is, moreover, the risk that during the initialization the transmitter may be too far away from the receiver. The receiver then does not receive the start value generated in the key. As a result, while the transmitter is initialized, the receiver is not. As a result, the transmitter can no longer control the central locking system, since the two are no longer "compatible with one another."

German patent DE 44 11 450 C1 describes a system in which one-way function values for protecting the code are stored at the vehicle end. Reading out the values does not make it possible to manufacture a duplicate key without authorization and thus perform unauthorized initialization.

German patent DE 195 16 992 C1 describes an anti-theft system in which a request signal is transmitted from the motor vehicle to a transponder. The request signal contains a memory address at which the transponder reads out a corresponding code signal in its memory and transmits it back to the motor vehicle.

A further anti-theft system is described in German published non-prosecuted patent application DE 43 25 221 A1. There, a memory standby state is activated by means of a coding of a key, which coding has already been stored. After the key has been identified, the anti-theft system activates a mode by means of which the coding of a further key is stored in the anti-theft system.

SUMMARY OF THE INVENTION

It is accordingly an object of the invention to provide a method of initializing an anti-theft system of a motor vehicle, which overcomes the above-mentioned disadvantages of the prior art devices and methods of this general type and wherein the anti-theft system is of simple construction and allows a user easy and reliable initialization.

With the foregoing and other objects in view there is provided, in accordance with the invention, a method of initializing an anti-theft system of a motor vehicle, wherein the anti-theft system includes:
 a key with a remote control unit for selectively locking and unlocking a central locking system and with a transponder for releasing an immobilizer;
 a receiver disposed in the motor vehicle and adapted to receive and evaluate signals of the remote control unit; and
 a transceiver unit on a lock of the motor vehicle, the transceiver unit being adapted to transmit a request signal to the transponder, to receive a coded response signal from the transponder, and to check the response signal for authorization;
 the method which comprises the following steps:
  placing the receiver and the transceiver unit into an initialization state;
  transmitting a request signal to the transponder;
  transmitting a response signal to the transceiver unit;
  checking the response signal for its authorization by comparing an item of code information contained in the response signal with an expected item of reference code information;
  if the response signal is determined to be authorized in the checking step, transmitting a coded start value to the key and storing the start value in a memory of the key; and
  forwarding the start value from the key to the receiver.

In other words, the objects of the invention are satisfied with the following sequence: First, a vehicle-end receiver and a transceiver unit in the motor vehicle are placed in an initialization state. Then, the transceiver unit transmits a request signal to a transponder on a key which responds to it with a response signal. The authorization of the response signal is checked in the transceiver unit. If the response signal is authorized, a start signal is transmitted to the key and stored there. In addition, the start signal is forwarded from the key to the receiver and likewise stored there.

During the process, the key is located in the direct vicinity of the receiver. This largely ensures.that the signals transmitted during the initialization reach both the key and the receiver.

In accordance with an added feature of the invention, the start value is stored in a memory of the receiver, and a coded remote-control rolling code signal is generated with the start value as an initial value of the rolling code.

In accordance with another feature of the invention, a successful initialization is indicated to the user with a display unit, such as by visual and/or audible display.

In accordance with an additional feature of the invention, the signals between the transponder and the transceiver unit are transmitted in the form of inductive energy, optical energy, and/or data signals. The signals from the remote control unit to the receiver are transmitted as optical and/or high-frequency data signals.

In accordance with a further feature of the invention, the placing step comprises activating the key in the lock in a defined unusual manner within a predefined time period.

In accordance with an alternative feature of the invention, an external device is connected to a diagnostics interface of the motor vehicle and an initialization signal is transmitted that places the receiver and the transceiver unit in the initialization state.

With the above and other objects in view there is also provided, in accordance with the invention, a method of initializing the anti-theft system which comprises the following steps:

placing the receiver and the transceiver unit into an initialization state;

transmitting a request signal to the transponder;

calculating a response signal and returning the response signal to the transceiver unit and/or generating a start value in the transponder;

checking the response signal for its authorization by comparing an item of code information contained in the response signal with an expected and stored item of reference code information;

transmitting a coded start value to the key or requesting the transponder to use the start value if the response signal has been detected as authorized; and forwarding the start value from the key to the receiver or requesting to accept the previously calculated start value.

Other features which are considered as characteristic for the invention are set forth in the appended claims.

Although the invention is illustrated and described herein as embodied in a method for initializing an anti-theft system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
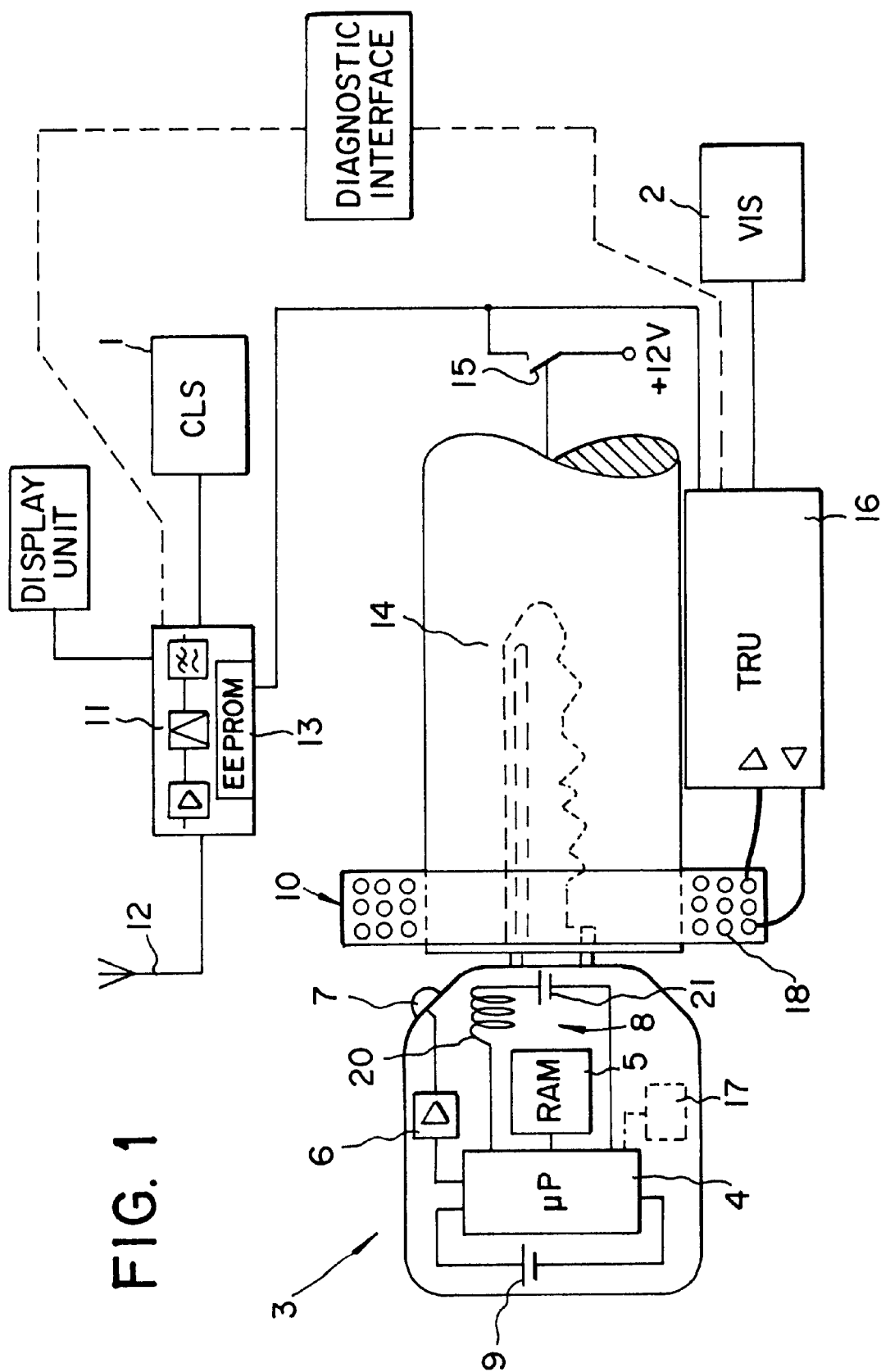
FIG. 1 is a schematic block circuit diagram of an anti-theft system.

Referring now to the figures of the drawing in detail and first, particularly, to FIG. 1 thereof, the anti-theft system illustrated therein has a remote-controlled central locking system (CLS) 1 and an electronic immobilizer (VIS—vehicle immobilization system) 2. A grip of a door key or ignition key 3 carries an electronic unit which is used to transmit, in a wireless fashion, coded signals (referred to below as code signals) for the remote-controlled locking or unlocking of the central locking system 1 or coded signals (referred to below as response code signals) for releasing the immobilizer 2.

The electronic unit on the ignition key 3 has a central control unit ($\mu$P) 4 which is electrically connected to a memory 5. As indicated, the memory 5 may be a RAM. The control unit 4 controls a transmitter 6 so that the latter transmits the code signals for locking or unlocking door locks of the central locking system 1 via a transmitter element 7. Likewise, the control unit 4 controls an oscillating circuit 8 in order to receive energy or data (transmitted in a request signal) or to transmit data with an item of code information (transmitted in the response code signal in a modulated form).

In addition, there is a replaceable power source, for example a battery 9, arranged on the ignition key 3. The power source supplies the components of the electronic unit with power. In addition, the ignition key 3 can have one or more non-illustrated push-button keys whose activation causes a code signal to be generated in the control unit 4 and transmitted via the transmitter 6.

The coded signals which are transmitted each contain an item of coded information (code information) which is compared at the receiver end with an expected item of code information (reference code information). The control instructions contained in the signals are implemented only if the two correspond to a satisfactory degree.

A receiver 11 receives the code signal via its antenna 12. The receiver 11 and the antenna 12 are arranged at a suitable point in the motor vehicle. The antenna 12 may be disposed, for instance, in an exterior mirror, on the interior mirror or at some other point which can be reached satisfactorily by signals from both outside and inside the vehicle. The receiver 11 has a memory unit 13 (an EEPROM in the preferred mode), in which an item of reference code information is permanently stored. As soon as the code signal is received, the code information contained in it is compared with the reference code information. When the two correspond, a door lock, all the door locks and/or the lock of the trunk are locked or unlocked.

When the user has entered the vehicle and then wishes to start the internal combustion engine, he or she inserts the ignition key 3 into a steering lock or ignition lock 14 and turns the ignition key 3. This activates an ignition switch 15. As a result, a transceiver unit (TRU—transmit-receive unit) 16 on the ignition lock 14 is activated. The transceiver unit 16 is magnetically coupled to the key-end oscillating circuit 8 when the ignition key 3 is inserted by means of a lock-end oscillating circuit 10 with a coil 18 and a capacitor. As a result, a request signal is transmitted inductively to the oscillating circuit 8 on the ignition key 3.

The key-end oscillating circuit 8 forms, together with the control unit 4 and the memory 5 (RAM), a transponder. The transponder responds automatically to a received request signal with a response code signal. With the response code signal, the transponder attempts to prove its authorization (authentication).

When the transceiver unit 16 receives a response code signal, the code information contained in the response code signal is compared with an expected item of reference code information. If they correspond (successful authentication), an enable signal is generated by means of which an electronic immobilizer 2 is released.

If there is an electronic steering lock, the same can also be unlocked by means of the response code signal or by the code signal, so that the steering wheel can be turned.

The code information contained in the code signal or in the response code signal as well as the reference code information can be respectively generated with the aid of a mathematical algorithm. The mathematical algorithm can be implemented in hardware (as a logic circuit) or by means of software on the ignition key 3 or in the transceiver unit 16.

An item of code information which is transmitted in the code signal from the ignition key 3 to the receiver 11 for the purpose of locking or unlocking is changed with respect to the previously transmitted code information each time a transmission takes place. The modification is carried out here with the aid of the mathematical algorithm within a cycle (for this reason it is also referred to as a rolling code). Each recalculation is based on the previously received item of code information as the start value. The length of the cycle, i.e. the total number of possible different code signals depends on the complexity of the algorithm and on the bit length of the code information. In a reliable anti-theft system, the code information is at least 32 bits long. The cycle length here is thus made up of several billion different items of code information.

The modification of the code information can also be carried out with the aid of so-called crypto code or code encryption. Here, each recalculation uses the previously received item of code information as start value. The received code information has previously been generated, as a random value, in the transceiver unit 16. In order to calculate the new item of code information, a secret crypto key is required both at the lock end and at the key end. The crypto key cannot be read out from the outside and is stored with access protection in each case in a security memory 17 (such as a separate EEPROM).

In order to achieve correspondence with the reference code information, it is therefore necessary to have knowledge of the previously transmitted code information together with the algorithm. As a result, code signals which are intercepted without authorization cannot alone be used to unlock the vehicle, since a code signal which has been changed with the algorithm is expected the next time.

In the ignition key 3, the last item of code information to have been transmitted is temporarily stored in the memory 5, specifically either for as long as no new code signal has been generated or for as long as the battery 9 supplies the memory 5 with energy. In the memory unit 13 of the receiver 11, the code information which has been recognized as being authorized is permanently stored until a new item of code information is recognized as being authorized and the old code information is overwritten, deleted, or becomes invalid.

If the energy supply of the battery 9 of the key 31 is exhausted, then the ignition key 3 no longer "knows" the last code information to have been transmitted. On the other hand, the receiver 11 determines the reference code information on the basis of its code information which was the last to have been recognized as authorized. If a code signal is transmitted to the receiver 11 in this case after the battery 9 has been replaced, the code information contained in that signal will, with a very high degree of probability, not be recognized as authorized. Even a synchronization range which may be present (limited number of successive items of code information in the cycle) can, as a rule, no longer bring about synchronization.

A synchronization range that is present helps only in the case where the code information of the key 3 is just a few cycle steps ahead of the reference code information in the receiver 11 as a result of "blind" activation of the key 3.

However, if the battery 9 of the key 3 is "exhausted," then the entire code information of the key 3 is lost. As a result, the anti-theft system must be newly initialized so that the same code information is present both in the ignition key 3 and in the receiver 11, in order to generate the code signal and activate the central locking system 1 of the vehicle by remote control.

Figure 2:
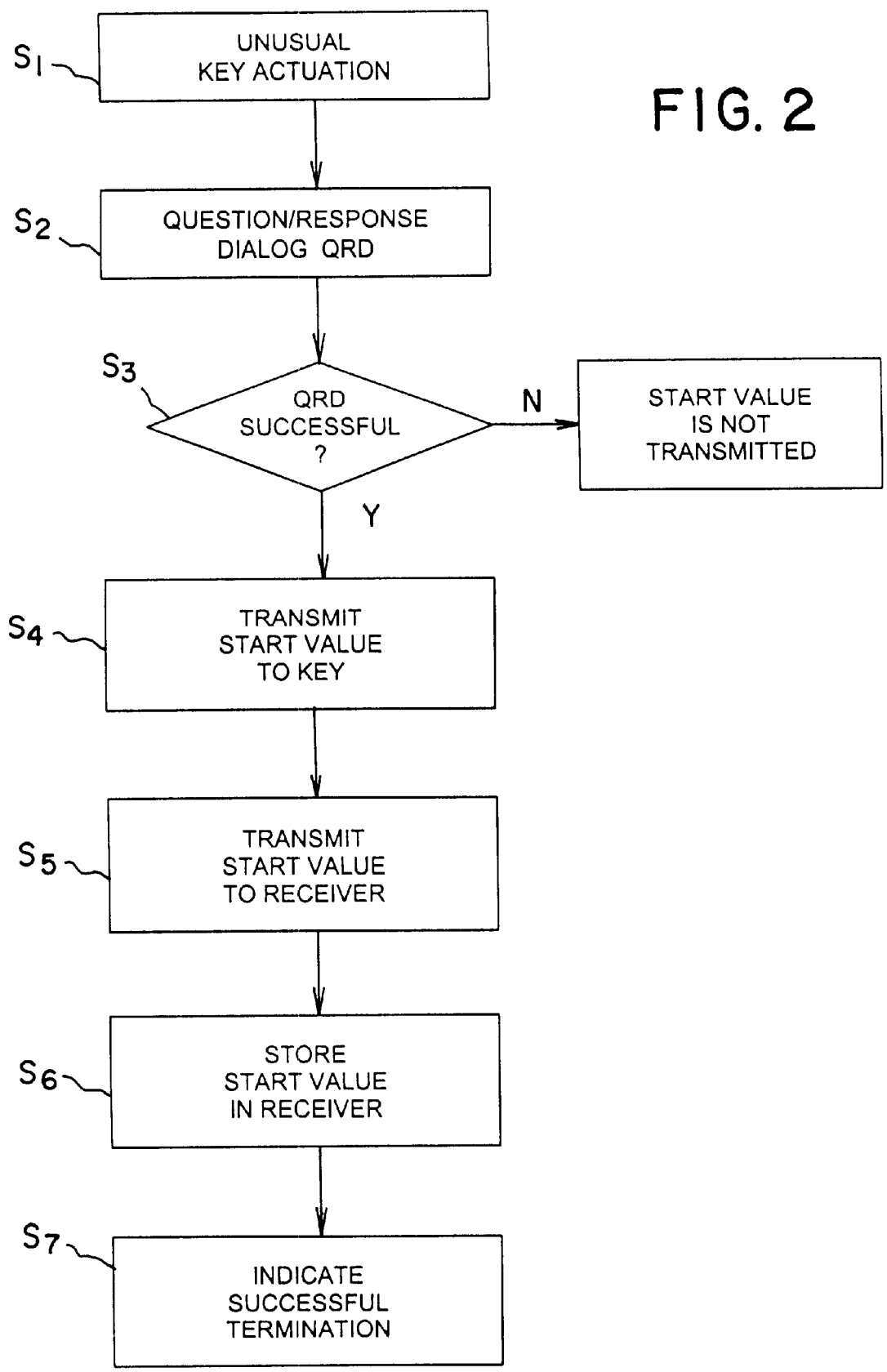
FIG. 2 is a flowchart of a method sequence for initializing the anti-theft system of FIG. 1.

The method according to the invention for initializing the anti-theft system will now be explained in more detail with reference to FIG. 2:

First, the user must enter the vehicle. If it is not possible to unlock the vehicle doors by means of the code signal because the battery 9 of the ignition key 3 has been exhausted, then the user can mechanically unlock the doors with the aid of the bit of the ignition key 3. In order to initiate the initialization, in step S1 the user plugs the ignition key 3 into the ignition lock 14 and activates the ignition lock 14 within a prescribed time period in an unusual fashion. This can be rapidly turning the key 3 backwards and forwards at least three or more times within, for example, 10 seconds from the home position into a limit position and back again.

The unusual actuation (repeated successive turning of the ignition key) of the ignition lock 14 must or should be clearly distinguishable from the customary activation (inserting the ignition key into the ignition lock 14 and turning the ignition key 3 from the home position into the starting position). The time period is therefore also predefined in such a way that it is possible to make a distinction from cases in which the ignition key 3 is, under certain circumstances, activated twice when it has not been possible to start the engine. The unusual actuation is therefore detected immediately and the anti-theft system is consequently placed in an initialization state. The anti-theft system can be initialized only in this initialization state.

At the end of the time period, the ignition key 3 should be in a rotary position in which the ignition switch 15 is switched on, and thus an electric connection is produced between the positive pole of the vehicle battery (also referred to as terminal 30) and a so-called terminal R. In that position, both the receiver 11 and the transceiver unit 16 are supplied with power (voltage of the onboard electrical system). The receiver 11 and the transceiver unit 16 can be supplied, for example, with +12V or +24V from the vehicle battery.

Owing to the repeated switching on (unusual actuation) of the ignition switch 15, the transceiver unit 16 is instructed to carry out a question/response dialog (QRD) in step S2. The transceiver unit 16 thereby transmits a request signal via its coil to the transponder in the ignition key 3. The transponder can draw from the request signal as much energy as is necessary to generate the response code signal.

After the reception of the request signal, the transponder generates a coded response code signal which is retransmitted to the transceiver unit 16 (the procedure of bidirectional data/power transmission is referred to as question/response dialog QRD). In step S3, the transceiver unit 16 checks the authorization of the code information contained in the response code signal. If the received code information is not recognized as authorized, then the initialization is terminated since it can be assumed that an unauthorized person is attempting to initialize the anti-theft system. If appropriate, an alarm can then be triggered.

If the response code signal is, on the other hand, recognized as authorized, a start value is transmitted to the ignition key 3 in step S4. The start value constitutes a response value for the calculation of the code information. The start value is received by the control unit 4 and stored in the memory 5 (RAM) as if it were a previously transmitted item of code information.

The start value is then transmitted to the receiver 11 via the transmitter 6 in step S5. The receiver 11 stores the start value in its memory unit 13 (EEPROM) in step S6. In the receiver 11, the start value is also treated as if it were an item of code information which has been previously received and recognized as authorized.

Thus, the start value which can be used as the basis for the generation of the next valid code signal using the mathematical algorithm is known both in the ignition key 3 and in the receiver 11.

As soon as the start value is stored both in the RAM of the ignition key 3 and in the EEPROM of the receiver 11, the initialization is successfully terminated. The successful initialization can then be displayed visually or audibly—under the control of the receiver 11—in step S7 by means of a non-illustrated acknowledgment unit in the motor vehicle. The acknowledgment unit used here may be any display units that are already present in the vehicle such as, for example, indicator lights, horn, lamps or LEDs in the dashboard, and the like.

The transceiver unit 16 only needs to be initialized once after its manufacture but thereafter no longer needs to be since the unit 16 later generates a random start value itself during each question/response dialog and communicates the value to the transponder by means of the request signal. The start value is then used as a basis both for the generation of the response code signal in the transponder and the generation of the reference code information in the transceiver unit 16.

The transceiver unit 16 was initialized, together with the ignition key 3, for the first time at the end of the line at the premises of the manufacturer of the motor vehicle. There, or even at the premises of the manufacturer of the anti-theft system, the mathematical algorithm was implemented in one or all of the ignition keys 3 assigned to the vehicle and in the transceiver unit 16. This algorithm cannot be "deciphered" by an external party. In addition to the algorithm, vehicle-specific or person-specific data can also be used to generate the code information.

At every activation (rotation of the ignition key or switching on of an ignition switch), the transceiver unit 16 generates a random value which is transmitted to the ignition key 3 as a request signal or as a start value. The response signal is generated in the ignition key 3 with the aid of the random value. Since the random value is known in any case in the transceiver unit 16, the reference code information can be generated from it with the same algorithm as in the transponder and can be compared with the code information of the response signal.

The memory 5 in the ignition key 3 is designed as a RAM. Since a RAM uses less energy in storing data, using a RAM prolongs the service life of the battery 9. The user does not need to replace the battery 9 so frequently if it is exhausted. A RAM also has the advantage that, when the battery voltage is switched off, for example by removing the battery 9, the data in the memory 5 are lost. Thus, an unauthorized person can no longer read out the data in the RAM in order to obtain the last item of code information used. The anti-theft system is thus rendered more difficult to outwit. In addition, a RAM is present in any case as a main memory for the control unit 4. Since the data are often accessed, it is advantageous to use a RAM since the data access uses up less energy than, for example, access to data in an EEPROM.

In addition, there may also be the security memory 17 in which, for example, the secret crypto key or other data which have to be stored permanently are stored so that they cannot be read out from the outside.

The control unit 4 on the ignition key 3 controls both the transmitter 6 and the oscillating circuit 8 of the transponder. The data for generating the code signal are obtained from the memory 5 (RAM, or in the case of a crypto code both RAM and the additional security memory 17). The data for generating the response code signal are conveyed to the transponder in the request signal.

The signals which are transmitted bidirectionally between the transceiver unit 16 and the transponder are transmitted inductively. For this purpose, there is on each side an oscillating circuit 8, 10 with one coil (20, 18) each and a capacitor 21, whereby the lock-end capacitor is not illustrated for reasons of clarity. The oscillating circuit 10 or 8 is made to oscillate by means of a high-frequency oscillation, as a result of which an alternating magnetic field is generated by the coil 18 or 20 (primary coil). The magnetic field here induces in the respective other coil 20 or 18 (secondary coil) an alternating voltage in which the transmitted code information is contained in modulated form. The code information is recovered by demodulation.

If the magnetic coupling between the two coils is good enough, no oscillating circuit is required. The data can then be transmitted to the secondary coil solely with the aid of an alternating magnetic field which is generated by an alternating current flowing across the primary coil.

Instead of inductive, bidirectional transmission of data and energy, a visual, bidirectional transmission can also be used. Preferably, the visual transmission takes place in the infrared range.

The code signal is transmitted unidirectionally and in wireless fashion between the transmitter 6 and the receiver 11. Advantageously, the code signal is transmitted as a high-frequency signal or as an optical (infrared) signal. However, the receiver 11 must be arranged in the vehicle such that it can receive, without interference, the code signal (or the start value) both from the ignition key 3 plugged into the ignition lock 14 and from outside the motor vehicle.

The method according to the invention for initializing the anti-theft system is carried out according to the invention with increased security since, instead of only a mechanical coding of the bit of the key (as it turns in the ignition lock 14), the reliable coding by means of a received response code signal which is recognized as valid is used in the transceiver unit 16. The anti-theft system can therefore be initialized only if an authorized response code signal has previously been received by the transceiver unit 16.

The start value which is transmitted from the ignition key 3 to the vehicle-end receiver 11 during the initialization is reliably received by the receiver 11, since the ignition key 3 is located in the vicinity of the receiver 11 during the initialization. This reduces the risk of the signal transmission being intercepted by third parties since the legally authorized user is present during the initialization. In addition, there may be provision for the start value signals to be transmitted with a reduced range during the initialization.

The term initialization as used herein should be understood to mean an initial or renewed allocation of a start value to generate an item of code information. Here, the code information is newly generated from a cyclical sequence of items of code information using a mathematical algorithm whenever the ignition key 3 is activated. The start value is updated both in the ignition key 3 and in the receiver 11. Typically, initialization is carried out when an ignition key 3 which has been lost is replaced by a new one. The old ignition key 3 thus becomes invalid.

Preferably, the receiver 11 and the transceiver unit 16 are placed in the initialization state during the first initialization at the end of the line of the automobile manufacturer by means of a special diagnostic signal. For this purpose, a device which can be externally connected to the motor vehicle transmits an initialization signal to the receiver 11 and to the transceiver unit 16 via a diagnostic interface and a bus line of the vehicle electrical system. In that case, the key 3 does not need to be activated in the ignition lock 14 in an unusual fashion in order to initiate the initialization. At a later time, the initialization can also be carried out in authorized workshops if these are equipped with a corresponding device and also authorized to do so.

The code signal can also contain control information by means of which the vehicle-end receiver 11 detects which functions in the motor vehicle are to be remote-controlled. However, control is carried out only if an authentication (checking of the authorization) has been carried out successfully by means of the received code information. Thus, windows, sunroof, folding top, seats, heater, air-conditioning system, ventilation system, mirrors, alarm system etc. can also be remote-controlled.

The control unit 4 can be realized by means of a microprocessor or a functionally equivalent unit. There can also be a microprocessor in the transceiver unit 16. The transceiver unit 16 can be accommodated in a tamper-proof fashion in the vicinity of the ignition lock 14 or else in a control unit of the vehicle, such as the engine control unit and/or a brake control unit and/or a transmission control unit. The coil 18 of the transceiver unit 16 is advantageously arranged at the front end of the ignition lock 14 so that, when the ignition key 3 is fully inserted, there is a good magnetic coupling with the coil 20 on the ignition key 3.

We claim:

1. A method for initializing an anti-theft system for a motor vehicle, wherein the anti-theft system includes:
    a key with a memory, a remote control unit for selectively locking and unlocking a central locking system, and a transponder for releasing an immobilizer, the memory storing code information;
    a receiver in the motor vehicle for receiving and evaluating signals from the remote control unit; and
    a transmitting and receiving unit on a lock of the motor vehicle;
    the method which comprises:
        initiating an initialization state of the receiver and of the transmitting and receiving unit;
        sending a request signal from the transmitting and receiving unit to the transponder;
        sending a response signal having code information back from the transponder to the transmitting and receiving unit;
        checking the response signal with the transmitting and receiving unit for authorization by comparing the code information contained in the response signal with expected and stored predetermined code information;
        emitting a coded starting value from the transmitting and receiving unit and sending the coded starting value to the key if the response signal was recognized as being an authorized response signal;
        storing the coded starting value in the memory of the key; and
        routing the coded starting value from the key to the receiver.

2. The method according to claim 1, which further comprises storing the coded starting value in a memory of the receiver, the coded starting value being an initial value for generating a coded remote-control changing code signal in the memory of the receiver.

3. The method according to claim 1, which further comprises at least one of visually and acoustically indicating successful initialization with an indicating unit.

4. The method according to claim 1, which further comprises:
    transmitting the signals between the transponder and the transmitting and receiving unit as one of inductive signals and optical signals in a form of at least one of energy and data; and
    transmitting the signals from the remote control unit to the receiver as one of optical and high-frequency data signals.

5. The method according to claim 1, which further comprises effecting the initiation of the initialization state by non-standard actuation of the key in the lock within a given time period.

6. The method according to claim 1, which further comprises effecting the initiation of the initialization state by plugging an external device onto a diagnostic interface and transmitting an initialization signal.

7. A method for initializing an anti-theft system for a motor vehicle, wherein the anti-theft system includes:
    a key with a remote control unit for selectively locking and unlocking a central locking system and with a transponder for releasing an immobilizer
    a receiver in the motor vehicle for receiving and evaluating signals from the remote control unit; and
    the method which comprises:
        initiating an initialization state of the receiver and the transmitting and receiving unit;
        sending a request signal from the transmitting and receiving unit to the transponder;
        calculating a response signal and sending the response signal having code information back from the transponder to the transmitting and receiving unit;
        checking the response signal with the transmitting and receiving unit for authorization by comparing the code information contained in the response signal with expected and stored predetermined code information;
        emitting a coded starting value from the transmitting and receiving unit and requesting the transponder to use the coded starting value if the response signal was recognized as being an authorized response signal; and
        requesting that the coded starting value of the transmitting and receiving unit be taken over by the receiver.

8. An anti-theft system for a motor vehicle with at least one lock, a central locking system, and an immobilizer, comprising:
    a key having a memory, a remote control unit for selectively locking and unlocking a central locking system, and a transponder for releasing an immobilizer, said memory storing code information;
    a receiver disposed in a motor vehicle for receiving and evaluating signals from said remote control unit; and
    a transmitting and receiving unit disposed on at least one lock of the motor vehicle;
    said key, said receiver, and said transmitting and receiving unit initialized by:
        initiating an initialization state of said receiver and of said transmitting and receiving unit;
        sending a request signal from said transmitting and receiving unit to said transponder;
        sending a response signal having code information back from said transponder to said transmitting and receiving unit;
        checking the response signal with said transmitting and receiving unit for authorization by comparing the code information contained in the response signal with expected and stored predetermined code information;
        emitting a coded starting value from said transmitting and receiving unit and sending the coded starting value to said key if the response signal was recognized as being an authorized response signal;
        storing the coded starting value in said memory of said key; and routing the coded starting value from said key to said receiver.

9. An anti-theft system for a motor vehicle with at least one lock, a central locking system, and an immobilizer, comprising:

a key having a memory, a remote control unit for selectively locking and unlocking a central locking system, and a transponder for releasing an immobilizer, said memory storing code information;

a receiver disposed in a motor vehicle for receiving and evaluating signals from said remote control unit; and a transmitting and receiving unit disposed on a lock for sending a request signal from said transmitting and receiving unit to said transponder, and for then emitting a coded starting value and sending the coded starting value to said key if a response signal from said key is recognized as an authorized response signal;

said key, said receiver, and said transmitting and receiving unit initialized by:

initiating an initialization state of said receiver and of said transmitting and receiving unit;

sending a request signal from said transmitting and receiving unit to said transponder;

sending a response signal having code information back from said transponder to said transmitting and receiving unit;

checking the response signal with said transmitting and receiving unit for authorization by comparing the code information contained in the response signal with expected and stored predetermined code information;

emitting a coded starting value from said transmitting and receiving unit and sending the coded starting value to said key if the response signal was recognized as being an authorized response signal;

storing the coded starting value in said memory of said key; and routing the coded starting value from said key to said receiver.

* * * * *